United States Patent
Hattori et al.

(10) Patent No.: US 7,043,113 B2
(45) Date of Patent: May 9, 2006

(54) OPTICAL MULTI/DEMULTIPLEXER, OPTICAL MULTI/DEMULTIPLEXING METHOD, AND OPTICAL FILTER

(75) Inventors: Toshiaki Hattori, Otake (JP); Norifumi Hirota, Otake (JP); Yoshihiro Uozu, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 80 days.

(21) Appl. No.: 10/835,333

(22) Filed: Apr. 30, 2004

(65) Prior Publication Data

US 2004/0202409 A1 Oct. 14, 2004

Related U.S. Application Data

(63) Continuation of application No. PCT/JP02/11156, filed on Oct. 28, 2002.

(30) Foreign Application Priority Data

Nov. 1, 2001 (JP) .................................. 2001-336599
Mar. 8, 2002 (JP) .................................. 2002-063360

(51) Int. Cl.
*G02B 6/28* (2006.01)

(52) U.S. Cl. ............................ 385/24; 385/31; 385/36; 385/88

(58) Field of Classification Search .................. 385/24, 385/31, 33–36, 88, 89
See application file for complete search history.

(56) References Cited

U.S. PATENT DOCUMENTS 4,550,975 A * 11/1985 Levinson et al. ............. 385/34
5,349,473 A * 9/1994 Kurasawa et al. ........... 359/654
6,334,014 B1 * 12/2001 Nitta et al. ................... 385/39
2002/0065186 A1 * 5/2002 Yoshii et al. .................. 501/63

FOREIGN PATENT DOCUMENTS

| JP | 49-102204 A | 9/1974 |
| JP | 54-51551 U | 4/1979 |
| JP | 54-138453 A | 10/1979 |

* cited by examiner

*Primary Examiner*—Juliana Kang
(74) *Attorney, Agent, or Firm*—Kendrew H. Colton, Esq.; Fitch Even Tabin & Flannery (57) ABSTRACT

Disclosed is an optical multi/demultiplexer, which comprises a graded index type light transmission section whose refractive index is continuously reduced in the direction from the center to the periphery thereof, a wavelength-multiplexed-light connecting section disposed at one of the axial ends of the light transmission section, and at least one monochromatic light connecting section disposed at the other axial end of the light transmission section. The wavelength-multiplexed-light connecting section and the monochromatic light connecting section are disposed relative to the light transmission section in such a positional relationship that a monochromatic light included in a wavelength multiplexed light entered from the wavelength-multiplexed-light connecting section into the one end of the light transmission section is emitted from the other end of the light transmission section at a position where the monochromatic light connecting section is disposed. The present invention can provide an optical multi/demultiplexer having a reduced number of components and allowing the number of assembling steps to be reduced while eliminating the need for complicated adjustments.

12 Claims, 9 Drawing Sheets

OPTICAL MULTI/DEMULTIPLEXER, OPTICAL MULTI/DEMULTIPLEXING METHOD, AND OPTICAL FILTER

CROSS REFERENCED APPLICATIONS

This is a continuation application of International Application PCT/JP02/11156, filed Oct. 28, 2002, the complete disclosure of which is incorporated herein by reference, which designated the U.S. and that International Application was not published under PCT Article 21(2) in English.

TECHNICAL FIELD

The present invention relates to an optical multi/demultiplexer, an optical multi/demultiplexing method, and an optical filter (optical switch) capable of picking up a light having a specific wavelength.

BACKGROUND ART

Late years, in connection with the advent of the multimedia information society with the popularization of portable telephones, motion picture communications, electronic commerce and others, the transmission volume of communication networks is being continuously increased. As a technique capable of sending and receiving a large amount of information communication at a lower cost, there has been employed a transmission system based on a wavelength division multiplexing transmission technology comprising giving different informations respectively, to lights different in wavelength, multiplexing the lights with the different wavelengths, and transmitting the wavelength multiplexed light through a single optical fiber. This transmission system uses a filter element for multiplexing/demultiplexing light, an optical filter or switch for selectively picking up a light having a specific wavelength from a wavelength multiplexed light including a plurality of wavelengths, and other components.

Figure 1:
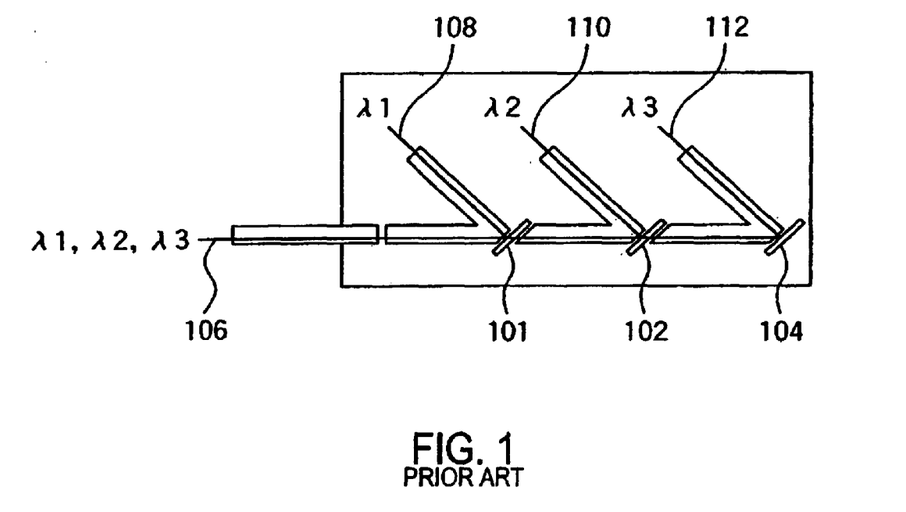
FIG. 1 is a schematic diagram showing a conventional optical demultiplexer.

As one of the filter elements for use in the above system, there has been known an optical demultiplexer as shown in FIG. 1. In this optical demultiplexer, a plurality of interference film filters 101, 102, 104 adapted, respectively, to reflect lights of different wavelengths are disposed on the optical path of a wavelength multiplexed light 106 transmitted through an optical fiber, so as to reflect lights of specific wavelengths $\lambda 1$, $\lambda 2$, $\lambda 3$ included in the wavelength multiplexed light 106, respectively, to obtain monochromatic lights 108, 110, 112 of specific wavelengths $\lambda 1$, $\lambda 2$, $\lambda 3$.

Figure 2:
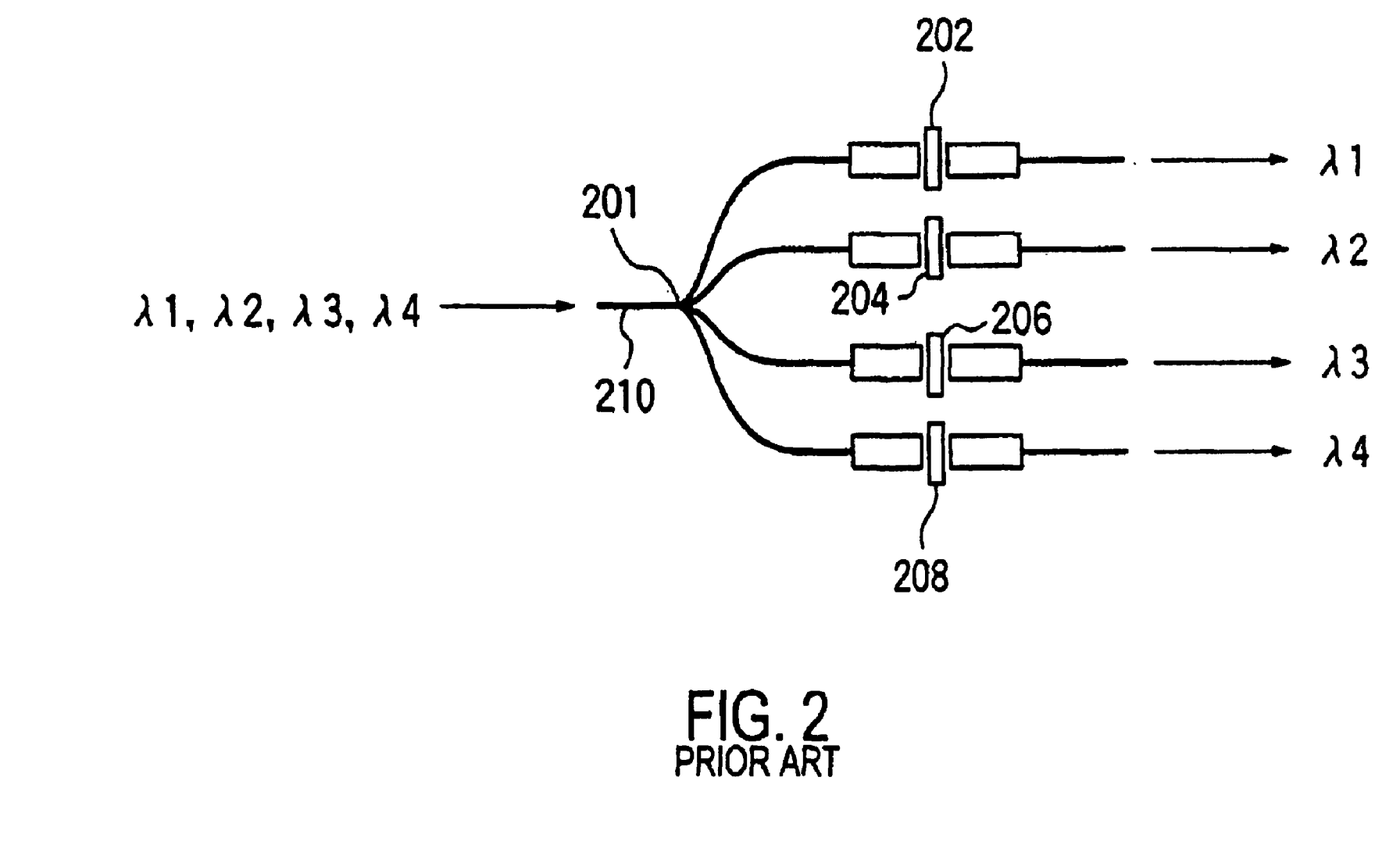
FIG. 2 is a schematic diagram showing another conventional optical demultiplexer.

There has also been known an optical demultiplexer as shown in FIG. 2, which comprises in combination a star coupler 201 and a plurality of interference film filters 202, 204, 206, 208. In this optical demultiplexer, the star coupler 201 for branching light is disposed on the optical path of a wavelength multiplexed light 210 transmitted through an optical fiber, and the interference film filters 202, 204, 206, 208 adapted, respectively, to allow only lights of wavelengths $\lambda 1$, $\lambda 2$, $\lambda 3$, $\lambda 4$ to be transmitted therethrough are disposed on corresponding branched optical paths.

When the above optical demultiplexers are used in such a manner that the direction of the optical path thereof is reversed, they can act as an optical multiplexer for multiplexing monochromatic light flux.

The above optical demultiplexer, optical multiplexer, or multi/demultiplexer essentially includes filters of the same number as that of multiplexed wavelengths. Thus, they involve a high-cost problem due to increase in the number of components and the number of assembling steps, and the need for complicated adjustments. Further, the optical demultiplexer using a star coupler involves a problem of degradation in output light intensity due to branching of a multiplexed light through the star coupler.

As optical filters or optical switches, there have been developed an optical filter having a grating disposed in a Mach-Zehnder interferometer type optical waveguide, and a thermooptic optical switch provided with a thin-film heater which is composed of a thin layer of metal, such as a chromium or copper, vapor-deposited on the above optical filter, and designed to generate heat in response to current supplied thereto to heat the optical waveguide.

However, the optical filter and the optical switch having the above-described optical waveguide is not suited for mass production due to its complicated production process. Further, since it is required in the process of forming the grating to periodically form notches in a core or clad with a high precision in the order of several microns or more, the cost is increased.

In view of the above circumstances, it is therefore an object of the present invention to provide an optical multi/demultiplexer having a reduced number of components and allowing the number of assembling steps to be reduced while eliminating the need for complicated adjustments.

It is another object of the present invention to provide an optical filter capable of being readily produced and varying the wavelength of a monochromatic light to be picked up.

SUMMARY OF THE INVENTION

According to a first aspect of the present invention, there is provided an optical multiplexer comprising a graded index type light transmission section whose refractive index is continuously reduced in the direction from the center to the periphery thereof, a wavelength-multiplexed-light connecting section disposed at one of the axial ends of the light transmission section, and at least one monochromatic light connecting section disposed at the other axial end of the light transmission section. The wavelength-multiplexed-light connecting section and the monochromatic light connecting section are disposed relative to the light transmission section in such a positional relationship that a monochromatic light included in a wavelength multiplexed light entered from the wavelength-multiplexed-light connecting section into the one end of the light transmission section is emitted from the other end of the light transmission section at a position where the monochromatic light connecting section is disposed.

In a preferred embodiment of the present invention, the light transmission section is made of plastic. In another preferred embodiment of the present invention, the materials of the light transmission section are different in Abbe number at 20 or more.

In still another preferred embodiment of the present invention, the light transmission section has an substantially cylindrical body, and the wavelength-multiplexed-light connecting section is disposed to the radially peripheral region of the light transmission section and in parallel with the axis of the light transmission section.

In yet another preferred embodiment of the present invention, the light transmission section has an substantially cylindrical body, and the wavelength-multiplexed-light connecting section is disposed to the radially central region of the light transmission section while being inclined at an angle close to the aperture angle of the light transmission section.

In yet still another preferred embodiment of the present invention, the monochromatic light connecting section is provided in a plural number.

According to a second aspect of the present invention, there is provided an optical demultiplexing method comprising: entering a wavelength multiplexed light formed by multiplexing a plurality of monochromatic lights, from one of the axial ends of a graded index type light transmission section whose refractive index is continuously reduced in the direction from the center to the periphery thereof; demultiplexing the wavelength multiplexed light into the monochromatic lights in the light transmission section; and emitting the monochromatic lights, respectively, from different positions of the other axial end of the light transmission section.

According to a third aspect of the present invention, there is provided an optical multiplexing method comprising: entering a plurality of monochromatic lights, respectively, from different positions of one of the axial ends of a graded index type light transmission section whose refractive index is continuously reduced in the direction from the center to the periphery thereof; multiplexing the monochromatic lights into a wavelength multiplexed light in the light transmission section; emitting the wavelength multiplexed light from the other axial end of the light transmission section.

According to a fourth aspect of the present invention, there is provided an optical filter comprising a graded index type light transmission section whose refractive index is continuously reduced in the direction from the center to the periphery thereof, a wavelength-multiplexed-light connecting section disposed at one of the axial ends of the light transmission section, and a monochromatic light connecting section disposed at the other axial end of the light transmission section.

In a preferred embodiment of the present invention, the light transmission section has a refractive index profile constant to be varied according to temperature, and the optical filter further includes temperature varying means for varying the temperature of the light transmission section to vary the positions in the other axial end of the light transmission section where a plurality of monochromatic lights included in a wavelength multiplexed light entered from the wavelength-multiplexed-light connecting section into the light transmission section are to be emitted, respectively, therefrom, so as to allow either one of the monochromatic lights to be selectively entered into the monochromatic light connecting section.

In the optical filter having the above structure, the wavelength of the monochromatic light to be introduced into the monochromatic connecting section can be varied by varying the temperature of the light transmission section. Thus, a desired wavelength of light can be selectively picked up with a simple structure.

In another preferred embodiment of the present invention, the light transmission section is made of plastic. In still another preferred embodiment of the present invention, the refractive index profile of the light transmission section has a temperature dependent constant of $5 \times 10^{-5}$ or more. In yet another preferred embodiment of the present invention, the light transmission section has an substantially cylindrical body, and the wavelength-multiplexed-light connecting section is connected to the light transmission section in parallel with the axis of the light transmission section. In yet still another preferred embodiment of the present invention, the temperature varying means includes a Peltier element.

DESCRIPTION OF THE PREFERRED EMBODIMENT

Figure 3:
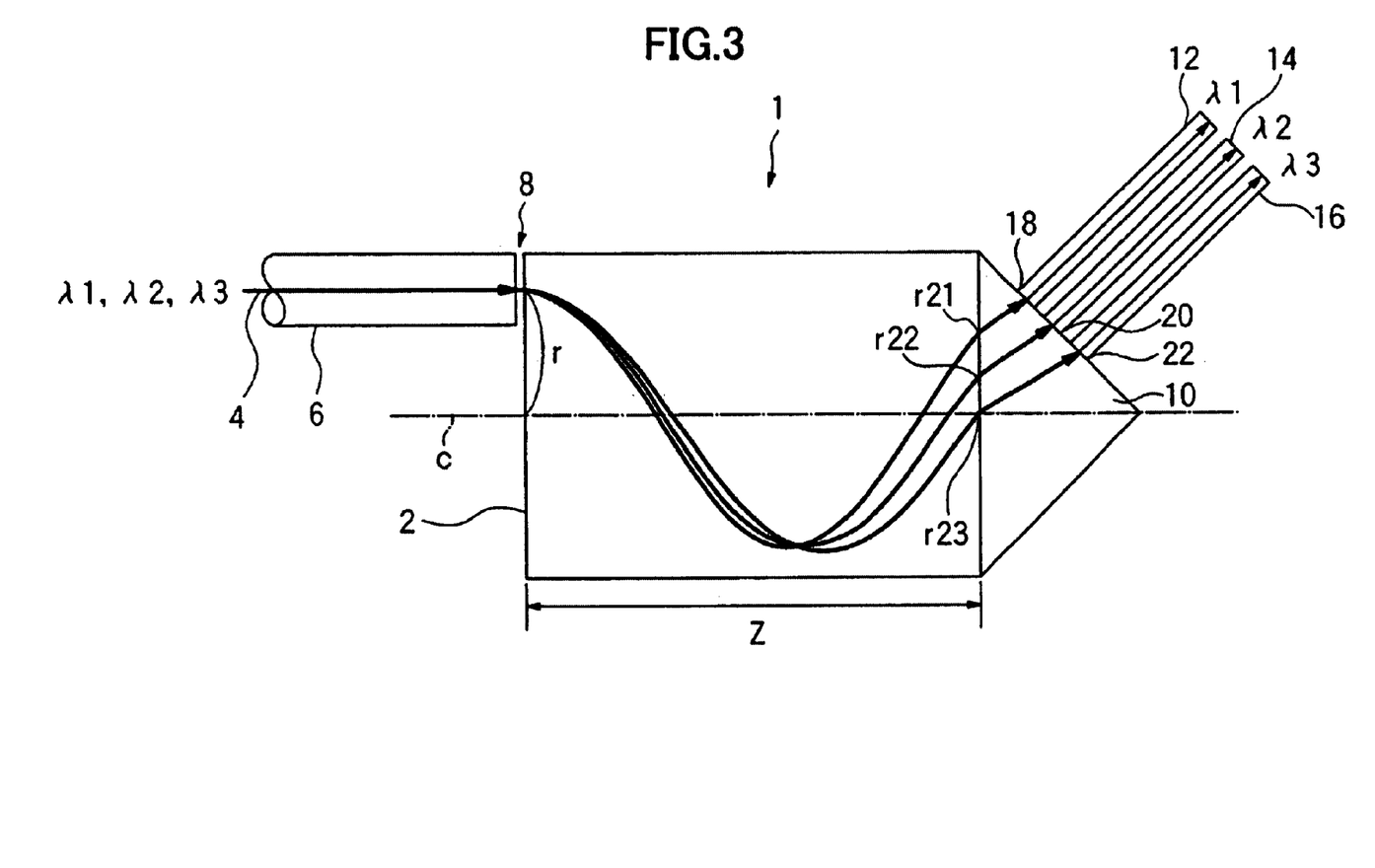
FIG. 3 is an explanatory schematic side view of the structure and function of an optical demultiplexer according to a first embodiment of the present invention.

With reference to the drawings, a preferred embodiment of the present invention will now be described in detail. FIG. 3 is a schematic diagram showing an optical demultiplexer 1 according to a first embodiment of the present invention. As shown in FIG. 3, the optical demultiplexer 1 includes a light demultiplexing section 1. This light demultiplexing section 2 has an substantially cylindrical shape, and serves as a graded index type light transmission section whose refractive index is continuously reduced in the direction from the axis c to the periphery thereof. In the first embodiment, the refractive index n of the light demultiplexing section 2 has a distribution approximated by the following formula (1):

$$n(r) = n_0 \times (1 - g^2 \times r^2/2) \quad (1),$$

wherein $n_0$: refractive index on the axis c, g: refractive index profile constant, and r: radial distance from the axis c.

For example, the light demultiplexing section 2 is a light transmission section made of inorganic glass through an ion exchange process, or a light transmission section made of plastic. The light demultiplexing section 2 has a periphery covered with a cladding layer (not shown) to allow a light entered from one (left side in FIG. 3, hereinafter referred to as "first axial end") of the axial ends thereof to be propagated through the inside thereof and emitted from the other axial end (right side in FIG. 3, hereinafter referred to as "second axial end").

As described later, the light demultiplexing section 2 in the first embodiment is used to multiplex and demultiplex light by utilizing the wavelength dispersion characteristic of the light demultiplexing section 2 such that it has different refractive index profiles with respect to each of different wavelengths of light. For this purpose, the light demultiplexing section 2 is preferably made of materials largely different in Abbe number to increase the difference in refractive index profile with respect to each of different wavelengths of light. The difference in Abbe number is preferably 20 or more, more preferably 50 or more. While it is preferable to set the difference in Abbe number as large as possible, it is typically set at 80 or less.

The optical demultiplexer 1 includes an incidence-side connecting section 8 serving as a wavelength-multiplexed-light connecting section for allowing an optical fiber 6 transmitting a wavelength multiplexed light 4 to be connected thereto, at the first axial end of the light demultiplexing section 2. Preferably, the incidence-side connecting section 8 is disposed in the peripheral region of the light demultiplexing section in substantially parallel with the axis c of the light demultiplexing section 2 to allow a light to be entered into the peripheral region (radially peripheral region) in substantially parallel with the axis of the light demultiplexing section 2.

A glass optical fiber made of silica glass, and a plastic optical fiber made of material such as polymethylmethacrylate, polystyrene or polycarbonate can be used as the optical fiber 6 to be connected to the optical demultiplexer 1.

The optical fiber 6 is not limited to one having a specific refractive index profile, but may be a conventional optical fiber, such as step-index (SI) type of optical fibers or graded-index type (GI) optical fibers.

The optical demultiplexer 1 also includes an outgoing-side connecting section serving as a monochromatic light connecting section for allowing a monochromatic light to be emitted therefrom, at the second axial end of the light demultiplexing section 2. In the first embodiment, the outgoing-side connecting section is formed in a prism 10 made of transparent resin. The prism 10 is connected to the second axial end of the light demultiplexing section 2 in such a manner that three types of monochromatic lights different in wavelength ($\lambda 1, \lambda 2, \lambda 3$) are entered to the prism 10 from the different positions (r21, r22, r23) in the second axial end of the light demultiplexing section 2, respectively. The surface of the prism 10 for emitting the monochromatic lights entered from the light demultiplexing section 2 has three of the outgoing-side connecting sections 18, 20, 22 for allowing three optical fibers 12, 14, 16 to be connected thereto in such a manner that the monochromatic lights emitted from the prism 10 are entered into the optical fibers 12, 14, 16, respectively. Therefore, each of these optical fibers may have the outgoing-side connecting section.

The incidence-side connecting section 8 and the outgoing-side connecting sections 18, 20, 22 are not limited to a specific structure, but any suitable conventional structure may be applied thereto. For example, these connecting sections may be composed of a transparent resin filled between the light demultiplexing section 2 and either one of a light source for emitting a wavelength multiplexed light, a light-receiving element for receiving a monochromatic light and an optical fiber.

Figure 4:
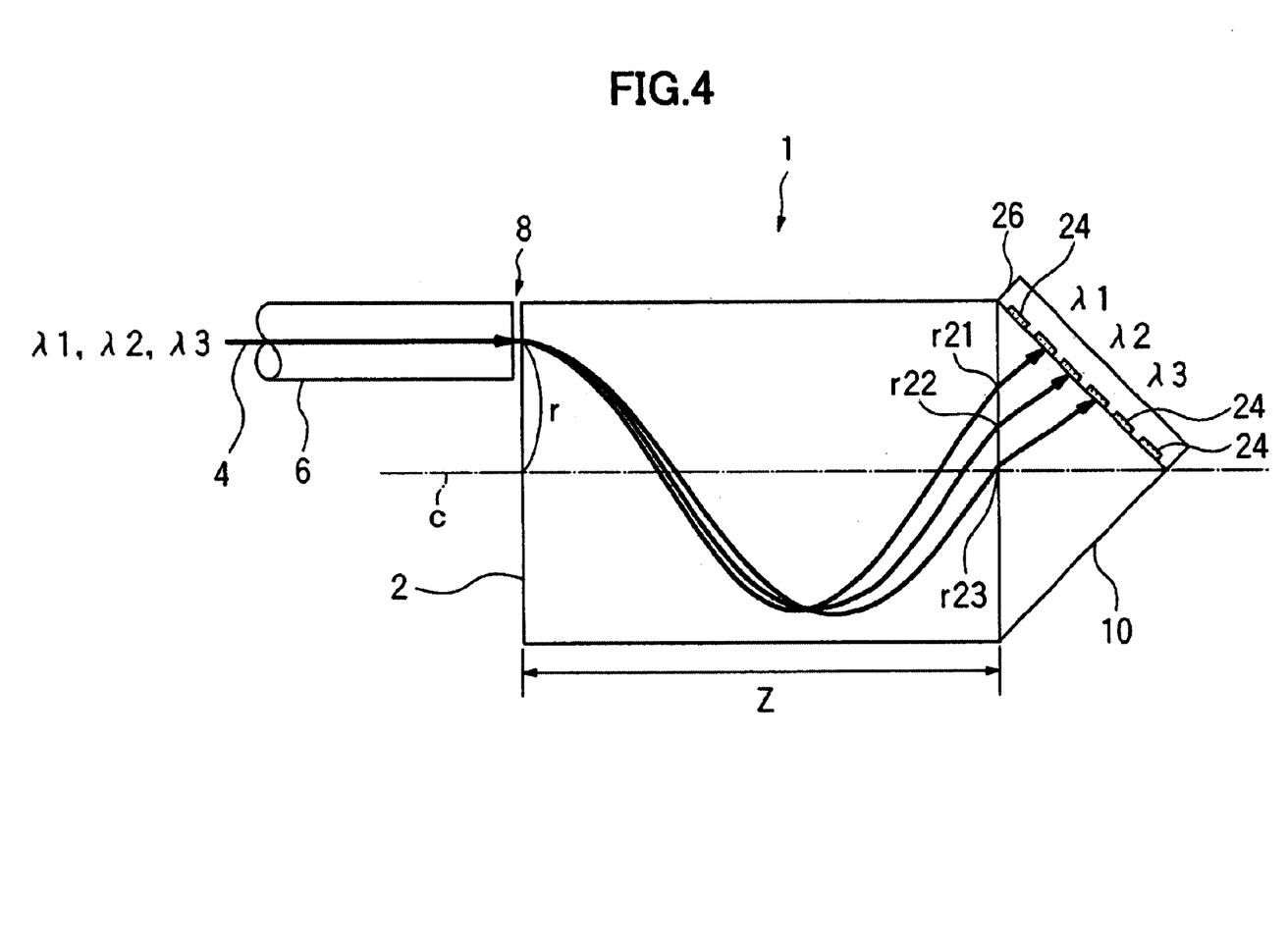
FIG. 4 is a schematic side view showing one modification of the optical demultiplexer according to the first embodiment of the present invention.
Figure 5:
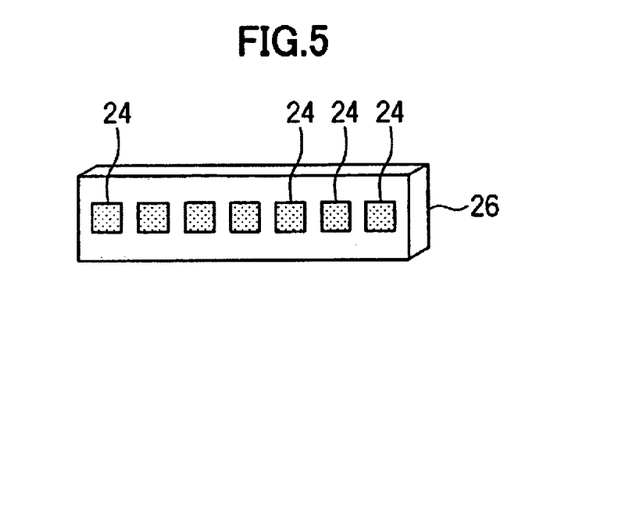
FIG. 5 is a schematic perspective view showing a photodetector array for use in the optical demultiplexer in FIG. 4.

Instead of the prism 10, a resin material itself or a resin product for forming the outgoing-side connecting section may be disposed at the second axial end of the light demultiplexing section 2. Further, as shown in FIG. 4, instead of the optical fibers 12, 14, 16, a photodetector array 26 (see FIG. 5) having a plurality of arrayed light-receiving elements (photodetectors) may be used to receive the emitted monochromatic lights. In this case, the light-receiving elements 24 are disposed, respectively, at positions corresponding to the positions where the monochromatic lights are emitted therefrom. That is, the light-receiving elements 24 serve as the outgoing-side connecting sections.

The optical demultiplexer 1 according to the first embodiment is operable to demultiplex the wavelength multiplexed light 4 formed by multiplexing the three types of monochromatic lights different in wavelength ($\lambda 1, \lambda 2, \lambda 3$) into the monochromatic lights having the wavelengths $\lambda 1, \lambda 2, \lambda 3$, respectively. In the optical demultiplexer 1, a light entered from the incidence-side connecting section 8 into the light demultiplexing section 2 is propagated through the light demultiplexing section 2 in a meandering manner in a given cycle. The light demultiplexing section 2 has the refractive index n continuously reduced in the direction from the axis c to the periphery thereof. Thus, if the entered light is a wavelength multiplexed light, each lights different in wavelength, which are included in the wavelength multiplexed light, will be separatedly propagated through different paths because the refractive index profile constant is varied according to the difference in wavelength. Thus, as shown in FIGS. 3 and 4, if the entered light is a wavelength multiplexed light, the monochromatic lights will be propagated, respectively, in different meandering cycles depending on the wavelengths ($\lambda 1, \lambda 2, \lambda 3$) thereof, and emitted, respectively, from the different positions (r21, r22, r23) of the light demultiplexing section 2.

Figure 6:
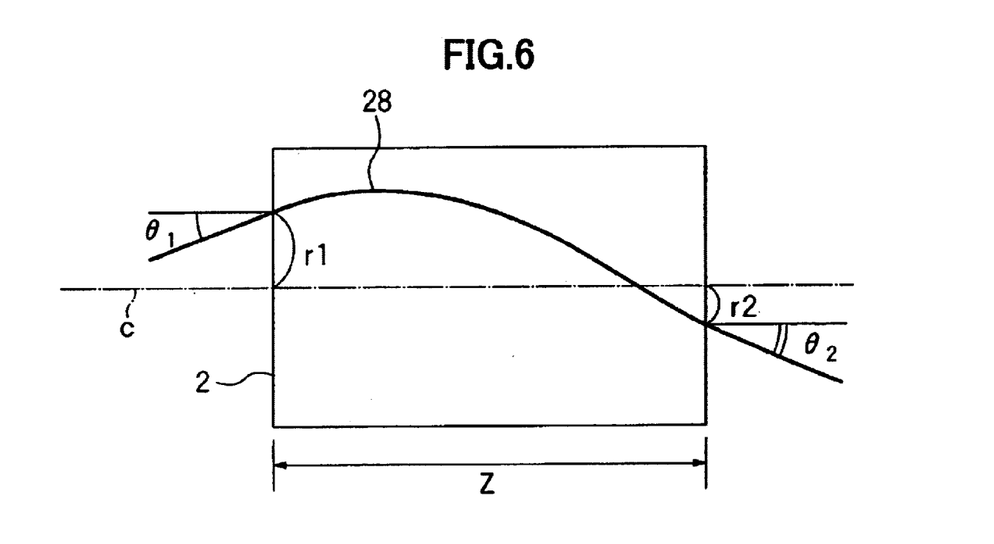
FIG. 6 is an explanatory diagram of the principle of the optical demultiplexer according to the first embodiment of the present invention.

A light matrix in the light demultiplexing section 2 having the refractive index profile approximated by the formula (1) is expressed by the following formula (2):

$$\begin{pmatrix} r2 \\ \theta 2 \end{pmatrix} = \begin{pmatrix} \cos(gZ) & \sin(gZ)/ng \\ -ng \cdot \sin(gZ) & \cos(gZ) \end{pmatrix} \begin{pmatrix} r1 \\ \theta 1 \end{pmatrix}, \quad (2)$$

wherein n1: refractive index on the axis c,
g1: refractive index profile constant,
Z: length of the light demultiplexing section 2,
r1: incidence position where a light 28 is entered into the first axial end of the light demultiplexing section 2,
$\theta 1$: incidence angle (rad) at which the light 28 is entered into the first axial end of the light demultiplexing section 2,
r2: outgoing position where the light 28 is emitted from the second axial end of the light demultiplexing section 2,
$\theta 2$: outgoing angle (rad) at which the light 28 is emitted from the second axial end of the light demultiplexing section 2 (see FIG. 6).

As seen in the formula (2), the outgoing position of the light in the outgoing end (second axial end) is changed depending on the refractive index profile constant g and the refractive index n. Thus, as shown in FIG. 3, when a plurality of lights different in wavelength ($\lambda 1, \lambda 2, \lambda 3$) are entered from the same incidence position (same radial position) in the first axial end of the light demultiplexing section 2, the lights are emitted, respectively, from the different outgoing positions (r21, r22, r23) in the second axial end of the light demultiplexing section 2 because the refractive index profile constant g and the refractive index n are different with respect to each of the lights.

The optical demultiplexer 1 demultiplexes the wavelength multiplexed light 4 by utilizing this phenomenon. Thus, in the optical demultiplexer according to the first embodiment, the position r (distance from the axis c) of the incidence-side connecting section 8 and the positions of the outgoing-side connecting sections 18, 20, 22 are arranged in such a positional relationship that the wavelength multiplexed light 4 formed by multiplexing the three monochromatic lights different in wavelength ($\lambda 1$, $\lambda 2$, $\lambda 3$) and entered into the light demultiplexing section 2 through the incidence-side connecting section 8 is demultiplexed in the light demultiplexing section 2 based on the difference in refractive index with respect to each of the wavelengths, and the demultiplexed monochromatic lights of the wavelengths ($\lambda 1$, $\lambda 2$, $\lambda 3$) are entered, respectively, into the three optical fibers 12, 14, 16 through the outgoing-side connecting sections 18, 20, 22.

The incidence-side connecting section 8 is disposed in the peripheral region of the light demultiplexing section 2 to allow the light to be entered into the light demultiplexing section 2 from the peripheral region, so that the respective optical paths for the wavelengths can be largely separated from each other. Thus, the outgoing positions r21, r22, r23 of the monochromatic lights and the positions of the outgoing-side connecting sections 18, 20, 22 can be spaced apart from each other to facilitate the detection of each of the monochromatic lights emitted from the light demultiplexing section 2. From this point of view, when a wavelength multiplexed light is entered into the light demultiplexing section 2 in parallel with the axis thereof, the position of the incidence-side connecting section 8 relative to the light demultiplexing section 2 is preferably arranged on the side of the periphery as close as possible. Otherwise, when the incidence-side connecting section 8 is located at or adjacent to the axis (radially central region) of the light demultiplexing section 2, the incidence-side connecting section 8 is preferably inclined relative to the axis of the light demultiplexing section 2 at an angle close to the aperture angle of the light demultiplexing section 2 to enter a light into the light demultiplexing section 2 at the aperture angle of the light demultiplexing section 2.

Figure 7:
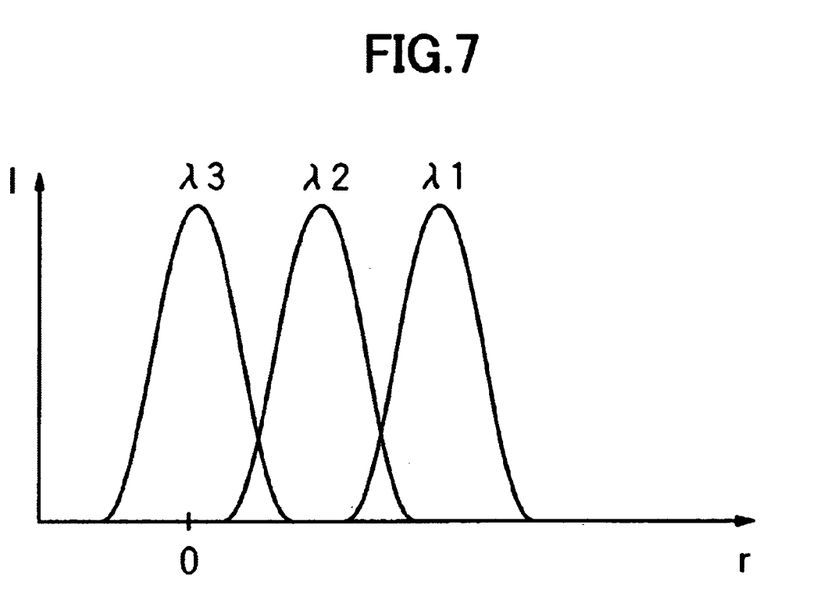
FIG. 7 is an explanatory diagram of the effect of the optical demultiplexer according to the first embodiment of the present invention.

For example, in the optical multiplexer 1 arranged as above, the diameter and the length (Z) of the light demultiplexing section 2 are set at 1 mm and 5.37 mm, respectively. Then, a wavelength multiplexed light formed by multiplexing three monochromatic lights different in wavelength ($\lambda 1=470$ nm, $\lambda 2=525$ nm, $\lambda 3=630$ nm) are entered from a position away from the center c of the first end of the light demultiplexing section 2 at a distance of 0.45 mm (or r=0.45 mm). Given that the refractive index profile constants $g_1$, $g_2$ and $g_3$ of the light demultiplexing section 2 with respect to the wavelengths $\lambda 1$, $\lambda 2$ and $\lambda 3$ are 0.902, 0.891 and 0.878, respectively, and the refractive indices $n_1$, $n_2$ and $n_3$ on the axis c with respect to the wavelengths $\lambda 1$, $\lambda 2$ and $\lambda 3$ are 1.518, 1.513 and 1.510, respectively. The monochromatic lights having the wavelengths ($\lambda 1=470$ nm, $\lambda 2=525$ nm, $\lambda 3=630$ nm) are emitted, respectively, from the different positions in the second axial end of the light demultiplexing section 2 (see FIG. 3). Specifically, the monochromatic light of the wavelength $\lambda 1$, the monochromatic light of the wavelength $\lambda 2$, and the monochromatic light of the wavelength $\lambda 3$ are emitted from the position r21 away from the center c at a distance of 0.06 mm, the position r22 away from the center c at a distance of 0.03 mm and the position r23 on the center c in the second axial end of the light demultiplexing section 2, respectively, to exhibit a spectra distribution having the intensity I as shown in FIG. 7. Thus, the demultiplexed monochromatic lights can be obtained at the outgoing-side connecting sections 18, 20, 22.

In the optical demultiplexer 1 according to the first embodiment, monochromatic light sources of wavelengths $\lambda 1$, $\lambda 2$, $\lambda 3$ are disposed, respectively, at the monochromatic light (outgoing-side) connecting sections 18, 20, 22 to use these outgoing-side connecting sections as incidence-side connecting sections, and a photodetector is disposed at the incidence-side connecting section 8 or wavelength-multiplexed-light connecting section to use the incidence-side connecting section 8 as an outgoing-side connecting section. Through this arrangement, the optical demultiplexer 1 can act as an optical multiplexer capable of multiplexing monochromatic lights of wavelengths $\lambda 1$, $\lambda 2$, $\lambda 3$ into a wavelength multiplexed light.

The optical demultiplexer according to the first embodiment can readily separate a light of a specific wavelength from a wavelength multiplexed light or can readily multiplex lights different in wavelength, with a simple structure without any complicated structure and optical component. In addition, this stricture can be eliminate the need for using an element for branching light, such as a star coupler, to prevent the degradation in light intensity.

While the optical demultiplexer according to the first embodiment has been constructed to pick up all monochromatic lights included in a wavelength multiplexed light, the optical demultiplexer of the present invention may be designed to pick up at least one monochromatic lights included in a wavelength multiplexed light.

Figure 8:
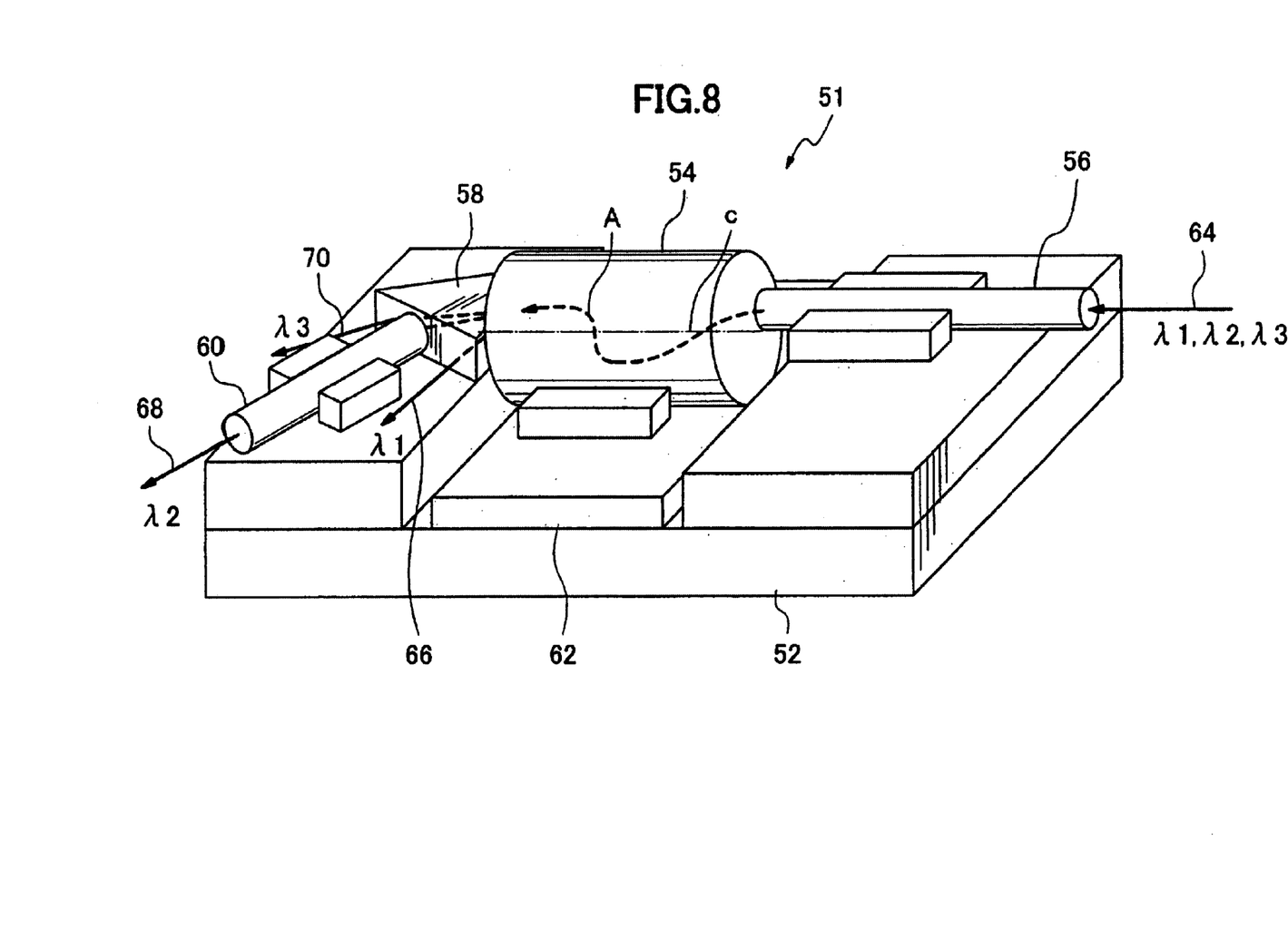
FIG. 8 is a schematic perspective view showing an optical filter according to a second embodiment of the present invention.

An optical filter (optical switch) according to a second embodiment of the present invention will be described below. FIG. 8 is a schematic perspective view showing the optical filter (optical switch) 51 according to the second embodiment of the present invention. As shown in FIG. 8, the optical filter 51 comprises a light transmission section 54 mounted on a base 52. The optical filter 51 further includes an incidence-side optical fiber 56 disposed on the one of the axial ends (incidence-side, hereinafter referred to as "first axial end") of the light transmission section 54 to enter a wavelength multiplexed light, a prism 58 disposed on the other axial end (outgoing side, hereinafter referred to as "second axial end") of the light transmission section 54, an outgoing-side optical fiber 60 connected to the prism 58, and a temperature controller 62 for adjusting the temperature of the light transmission section 54. The incidence-side optical fiber 56 is connected to the light transmission section 54 in parallel with the axis of the light transmission section 54.

In the second embodiment, a Peltier element is used as the temperature controller 62. While the Peltier element is desirable because it can effectively perform heating and cooling, any other suitable heating means, such as electric heater, or cooling means may be used.

Preferably, in order to uniformly heat or cool the light transmission section 54, the optical filter 51, particularly the light transmission section 54, is sealed with another resin, or the light transmission section 54 is contained in the temperature controller 62 formed in a tubular shape.

The light transmission section 54 has an substantially cylindrical shape, and serves as a graded index type light transmission section whose refractive index is continuously reduced in the direction from the axis c to the periphery thereof In the second embodiment, the refractive index n of the light transmission section 54 has a distribution approximated by the following formula (1):

$$n(r)=n_0\times(1-g^2\times r^2/2) \qquad (1),$$

wherein $n_0$: refractive index on the axis c,
  g: refractive index profile constant, and
  r: radial distance from the axis c.

The light transmission section 54 is an optical component made of inorganic glass through an ion exchange process, or made of plastic, and the periphery of the light transmission section 54 is covered with a cladding layer (not shown). The light transmission section 54 is designed to allow a light entered from the incidence-side optical fiber 56 through the first axial end (right side in FIG. 8) to be propagated through the inside thereof in a meandering manner as indicated by the arrow A in FIG. 8 and emitted from the second axial end (left side in FIG. 8).

When the entered light is a wavelength multiplexed light 64, a slightly different refractive index profile will be given to each of monochromatic lights different in wavelength, which are included in the wavelength multiplexed light, due to the chromatic aberration and the wavelength dispersion caused by the refractive index no and the refractive index profile constant g. Thus, the monochromatic lights 66, 68, 70 of the wavelengths λ1, λ2, λ3) included in the wavelength multiplexed light 64 entered into the light transmission section 54 will be propagated through the light transmission section 54, respectively, in different meandering cycles (paths). Therefore, the wavelength multiplexed light 64 formed by multiplexing the monochromatic lights of the wavelengths (λ1, λ2, λ3) and entered into the first axial end of the light transmission section 54 are demultiplexed into the monochromatic lights 66, 68, 70 based on their wavelengths, and the demultiplexed monochromatic lights are emitted, respectively, from the different positions in the second axial end of the light transmission section 54 at different angle.

A refractive index is varied depending on temperature. In the light transmission body 54 having a cylindrical body, the temperature dependence (variation with respect to temperature) of refractive index varies along the radial direction, and thereby the refractive index profile constant g varies depending on temperature. Thus, the outgoing positions where the monochromatic lights are emitted from the light transmission section 54 can be changed by varying the temperature of the light transmission section 54.

The variation in refractive index is apt to be dependent on the thermal expansion coefficient of a material. A light transmission section made of plastic can be preferably used to obtain a large variation of refractive index by a small amount of change in temperature. Further, the difference in thermal expansion coefficient of the material between the central and peripheral regions of the light transmission section can be preferably increased to obtain a large variation of refractive index profile constant by a small amount of change in temperature. Preferably, the refractive index profile of the light transmission section 54 has a temperature dependent constant of $5\times10^{-5}$ or more, as described later in detail.

The optical filter 51 according to the second embodiment is designed such that when the light transmission section 54 is set at a first temperature by the temperature controller 62, the monochromatic light 66 of the first wavelength (λ1) included in the wavelength multiplexed light 64 entered into the light transmission section 54 is entered into the outgoing-side optical fiber 60. The optical filter 51 is also designed such that when the light transmission section 54 is set at a second temperature by the temperature controller 62, the monochromatic light 68 of the second wavelength (λ2) included in the wavelength multiplexed light 64 entered into the light transmission section 54 is entered into the outgoing-side optical fiber 60, as shown in FIG. 8. Further, the optical filter 51 is also designed such that when the light transmission section 54 is set at a third temperature by the temperature controller 62, the monochromatic light 70 of the third wavelength (λ3) included in the wavelength multiplexed light 64 entered into the light transmission section 54 is entered into the outgoing-side optical fiber 60. That is, in the optical filter 51 according to the second embodiment, the wavelength of the light to be entered into the outgoing-side optical fiber 60 can be selectively varied by setting the light transmission section 54 at either one of the first, second and third temperatures using the temperature controller 62.

A glass optical fiber made of silica glass, and a plastic optical fiber made of material such as polymethylmethacrylate, polystyrene or polycarbonate can be used for the optical fibers 56, 60 to be connected to the light transmission section include The optical fibers 56, 60 are not limited to one having a specific refractive index profile profile, but may be a conventional optical fiber, such as step-index (SI) type of optical fibers or graded-index type (GI) optical fibers.

The optical filter according the second embodiment can readily separate a light of a specific wavelength from a wavelength multiplexed light, and can readily vary the wavelength to be separated, with a simple structure without any complicated structure and optical component.

The present invention is not limited to the above embodiments, but various modifications and alternations can be made without departing from the sprit and scope of the present invention defined only by the appended claims.

Figure 9:
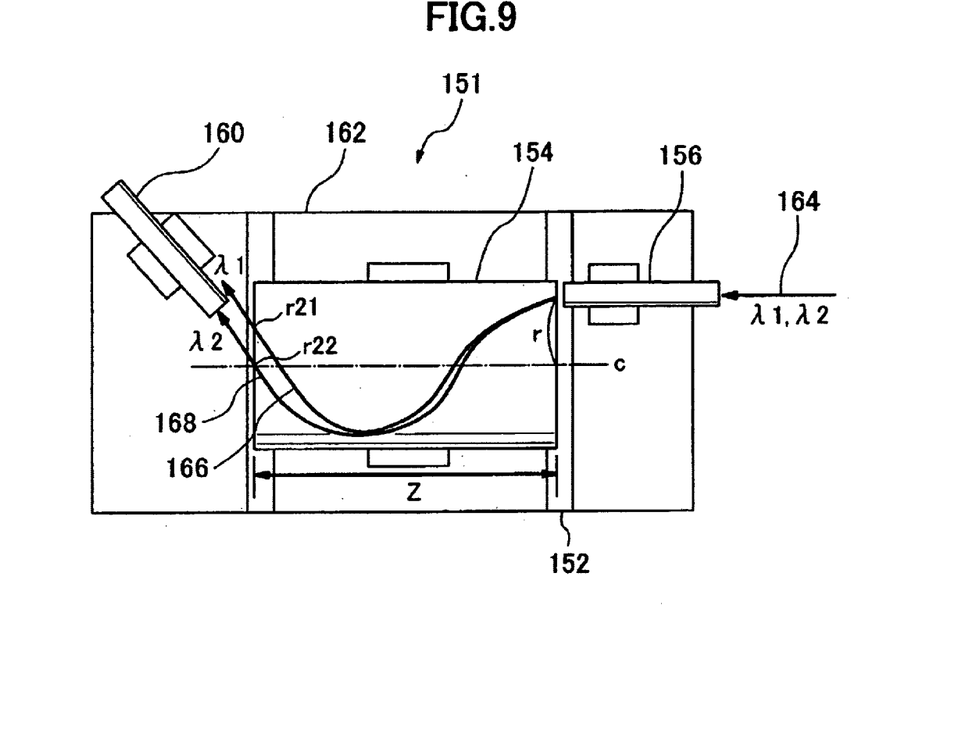
FIG. 9 is an explanatory schematic side view of the structure and function of an optical filter according to a third embodiment of the present invention.
Figure 10:
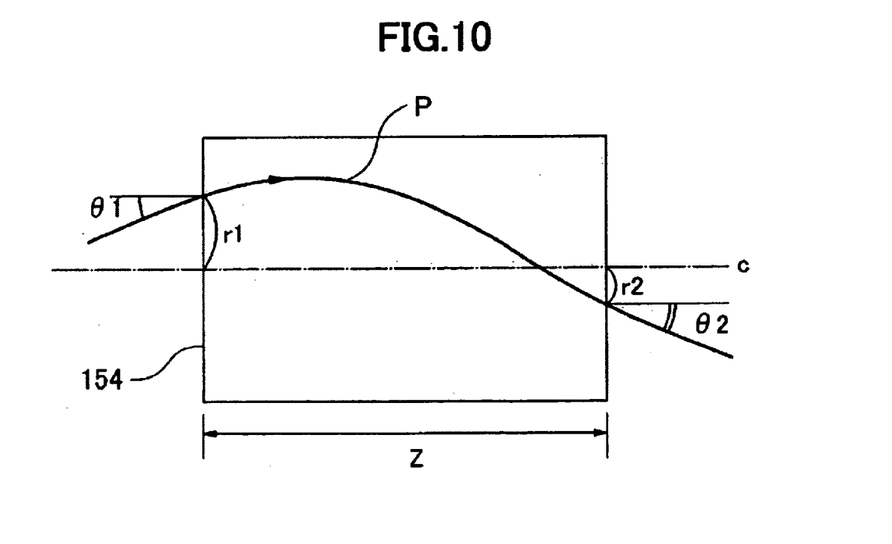
FIG. 10 is an explanatory diagram of the principle of the optical filter according to the third embodiment of the present invention.
Figure 11:
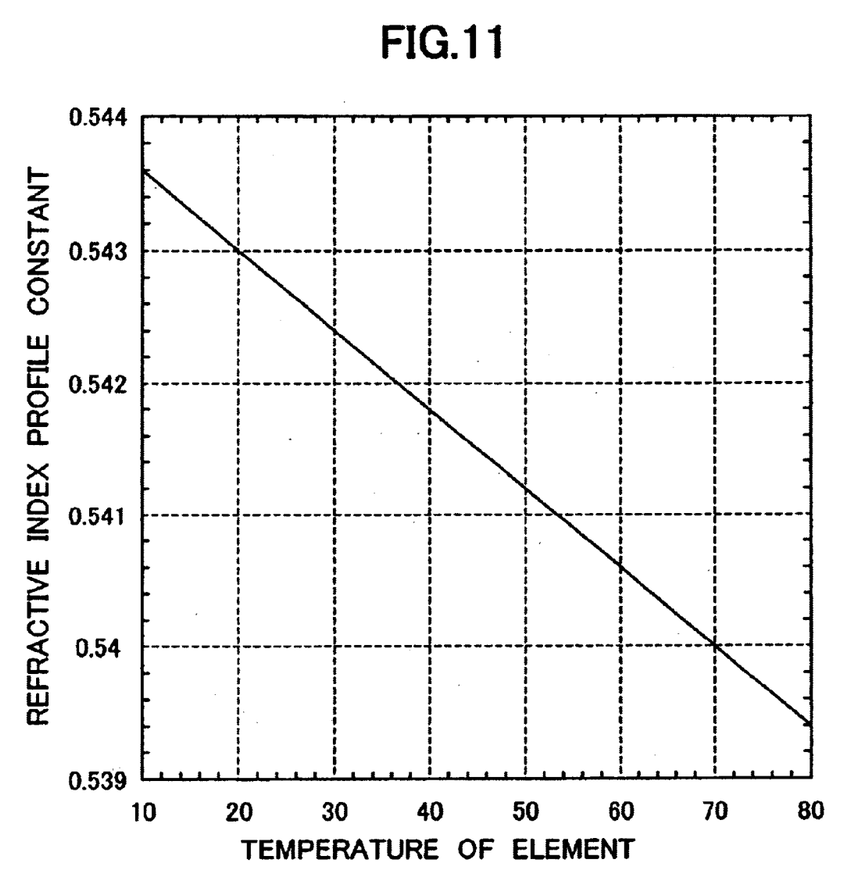
FIG. 11 is a graph showing the temperature dependence of the refractive index profile of a transmission section in the optical filter according to the third embodiment of the present invention.

With reference to FIGS. 9 to 11, an optical switch according to a third embodiment of the present invention. FIG. 9 is a schematic top plan view showing the optical filter 151 according to the third embodiment of the present invention. Except that no prism is provided on the outgoing side, the optical filter 151 essentially has the same structure as that of the optical filter 51 according to the second embodiment. Thus, the component corresponding to that of the optical filter 51 is defined by a reference numeral derived from adding 100 to the reference numeral of the corresponding component of the optical filter 51.

In the optical filter 151, a silica glass single-mode optical fiber serving as an incidence-side optical fiber 156 is connected to one (hereinafter referred to as "first axial end") of the axial ends of a graded index type plastic light transmission section 154 with 1 mm diameter and 8.73 mm length, at the position away from the axis c of the light transmission section 154 at a distance r of 0.45 mm and in parallel with the axis c. A Peltier element is used as a temperature controller 162. A wavelength multiplexed light 164 to be entered from the incidence-side optical fiber 156 is formed by multiplexing monochromatic lights having wavelengths λ1=1285.4 and λ2=1523.6. When the temperature of the light transmission section 154 is 20° C., the refractive index profile constant g1 of the light transmission section 154 for the wavelength λ1 is 0.543, and the refractive index profile constant g2 of the light transmission section 154 for the wavelength λ2 is 0.540. The refractive index n1 on the axis c for the wavelength λ1 is 1.497, and the refractive index n2 on the axis c for the wavelength λ2 is 1.493.

A light matrix in the light transmission section 154 having the refractive index profile approximated by the formula (1) is expressed by the following formula (2):

$$\begin{pmatrix} r2 \\ \theta 2 \end{pmatrix} = \begin{pmatrix} \cos(gZ) & \sin(gZ)/ng \\ -ng \cdot \sin(gZ) & \cos(gZ) \end{pmatrix} \begin{pmatrix} r1 \\ \theta 1 \end{pmatrix}, \quad (2)$$

wherein n1: refractive index on the axis c,
  g1: refractive index profile constant,
  Z: length of the light transmission section 154,
  r1: distance between the incidence position where a light P is entered into the first axial end of the light transmission section 154, and the axis c,
  θ1: incidence angle (rad) at which the light P is entered into the first axial end of the light transmission section 154, r2: distance between the outgoing position where the light P is emitted from the second axial end of the light transmission section 154, and the axis c, θ2: outgoing angle (rad) at which the light P is emitted from the second axial end of the light transmission section 154 (see FIG. 10).

As seen in the formula (2), the outgoing position of the light in the outgoing end (second axial end) is changed depending on the refractive index profile constant g and the refractive index n. Thus, as shown in FIG. 9, when the wavelength multiplexed light 164 including the plurality of lights different in wavelength (λ1, λ2) are entered from the same incidence position (same radial position) in the first axial end of the light transmission section 154, the lights 166, 168 are different in the outgoing position and the distance r21, r22 from the axis c, because the refractive index profile constant g and the refractive index n are different with respect to each of the wavelengths.

In the third embodiment, under the above temperature condition, the monochromatic light of the wavelength λ1=1285.4 nm, and the monochromatic light of the wavelength λ2=1523.6 nm are emitted, respectively, from the positions r21=0.01 mm and r22=0.00 mm, and only the monochromatic light 168 of the wavelength λ2 is entered into an outgoing optical fiber 160.

FIG. 11 is a graph showing the temperature dependence of the refractive index profile of the light transmission section 154. As seen in FIG. 11, in the light transmission section 154, the temperature dependence coefficient of the refractive index profile constant is $6.0 \times 10^{-5}/°$ C. Thus, if the light transmission section 154 is set at a temperature of 70° C., the refractive index profile constants g1 and g2 for the wavelengths λ1 and λ2 are varied, respectively, to 0.540 and 0.537, and the distances r21 and r22 between the axis c and each of the wavelengths λ1 and λ2 are varied, respectively, to 0.00 mm and −0.01 mm. Thus, while the light to be entered into the outgoing-side optical fiber 160 is the monochromatic light of the wavelengths λ2 when the temperature of the light transmission section 154 is 20° C., it will be switched to the monochromatic light of the wavelengths λ1. In this way, the wavelength of light to be picked up can be varied by varying the temperature of the light transmission section 154 using the temperature controller 162.

As mentioned above, the present invention can provide an optical multi/demultiplexer having a reduced number of components and allowing the number of assembling steps to be reduced while eliminating the need for complicated adjustments.

Further, the present invention can provide an optical filter capable of being readily produced and varying the wavelength of a monochromatic light to be picked up.

What is claimed is:

1. An optical multiplexer comprising:
  a graded index type light transmission section whose refractive index is continuously reduced in the direction from the center to the periphery thereof;
  a wavelength-multiplexed-light connecting section disposed at one of the axial ends of said light transmission section; and
  at least one monochromatic light connecting section disposed at the other axial end of said light transmission section,
  wherein said wavelength-multiplexed-light connecting section and said monochromatic light connecting section are disposed relative to said light transmission section in such a positional relationship that a monochromatic light included in a wavelength multiplexed light entered from said wavelength-multiplexed-light connecting section into said one end of said light transmission section is emitted from the other end of the light transmission section at a position where said monochromatic light connecting section is disposed, and wherein said light transmission section has an substantially cylindrical body, wherein said wavelength-multiplexed-light connecting section is disposed to the radially central region of said light transmission section while being inclined at an angle close to the aperture angle of said light transmission section.

2. The optical multiplexer as defined in claim 1, wherein said light transmission section is made of plastic.

3. The optical multiplexer as defined in claim 1, wherein said light transmission section is comprised of plastic materials whose Abbe numbers differ by 20 or more.

4. The optical multiplexer as defined in any one of claims 1 to 3, wherein said light transmission section has an substantially cylindrical body, wherein said wavelength-multiplexed-light connecting section is disposed to the radially peripheral region of said light transmission section and in parallel with the axis of said light transmission section.

5. The optical multiplexer as defined in claim 4, wherein said monochromatic light connecting section is provided in a plural number.

6. The optical multiplexer as defined in any one of claims 1 to 3, wherein said monochromatic light connecting section is provided in a plural number.

7. The optical multiplexer as defined in claim 1, wherein said monochromatic light connecting section is provided in a plural number.

8. An optical filter comprising:
  a graded index type light transmission section whose refractive index is continuously reduced in the direction from the center to the periphery thereof;
  a wavelength-multiplexed-light connecting section disposed at one of the axial ends of said light transmission section; and
  a monochromatic light connecting section disposed at the other axial end of said light transmission section, and wherein said light transmission section has a refractive index profile constant to be varied according to temperature, wherein said optical filter further includes temperature varying means for varying the temperature of said light transmission section to change the positions in the other axial end of said light transmission section where a plurality of monochromatic lights included in a wavelength multiplexed light-entered from said wavelength-multiplexed-light connecting section into said light transmission section are to be emitted, respectively, therefrom, so as to allow either one of said monochromatic lights to be selectively entered into said monochromatic light connecting section.

9. The optical filter as defined in claim 8, wherein said light transmission section is made of plastic.

10. The optical filter as defined in claim 8, wherein the refractive index profile of said light transmission section has a temperature dependent constant of $5 \times 10^{-5}$ or more.

11. The optical filter as defined in any one of claims 8, 9 or 10, wherein said light transmission section has an substantially cylindrical body, wherein said wavelength-multiplexed-light connecting section is connected to said light transmission section in parallel with the axis of said light transmission section.

12. The optical filter as defined in claim 8, wherein said temperature varying means includes a Peltier element.

* * * * *